US012737114B2

(12) United States Patent
Liu et al.

(10) Patent No.: US 12,737,114 B2
(45) Date of Patent: Sep. 15, 2026

(54) SELF-MANAGED DRAM MODULES WITH BUILT-IN ADAPTIVE DATA COMPRESSION

(71) Applicant: ScaleFlux, Inc., Milpitas, CA (US)

(72) Inventors: Yang Liu, Milpitas, CA (US); Fei Sun, Irvine, CA (US); Tong Zhang, Albany, NY (US)

(73) Assignee: SCALEFLUX, INC., Milpitas, CA (US)

( * ) Notice: Subject to any disclaimer, the term of this patent is extended or adjusted under 35 U.S.C. 154(b) by 0 days.

(21) Appl. No.: 18/905,527

(22) Filed: Oct. 3, 2024

(65) Prior Publication Data

US 2026/0099249 A1 Apr. 9, 2026

(51) Int. Cl.
*G06F 3/06* (2006.01)

(52) U.S. Cl.
CPC ............ *G06F 3/0608* (2013.01); *G06F 3/064* (2013.01); *G06F 3/0673* (2013.01)

(58) Field of Classification Search
CPC ......... G06F 3/608; G06F 3/064; G06F 3/0673
See application file for complete search history.

(56) References Cited

U.S. PATENT DOCUMENTS

| | | | | |
|---|---|---|---|---|
| 8,653,992 | B1 * | 2/2014 | Alakuijala | H03M 7/3086 341/51 |
| 10,382,751 | B1 * | 8/2019 | Zhao | H04N 19/105 |
| 2013/0297575 | A1 * | 11/2013 | Fallon | H03M 7/4043 707/693 |
| 2014/0095439 | A1 * | 4/2014 | Ram | G06F 3/067 707/640 |
| 2018/0183900 | A1 * | 6/2018 | Guilford | H04L 69/04 |
| 2019/0235758 | A1 * | 8/2019 | Constantinescu | G06F 3/0643 |
| 2019/0377804 | A1 * | 12/2019 | Wu | G06F 16/90335 |
| 2023/0305703 | A1 * | 9/2023 | Zamir | G06F 3/064 |
| 2024/0170089 | A1 * | 5/2024 | Chung | G11C 11/4087 |

* cited by examiner

*Primary Examiner* — Arpan P. Savla
*Assistant Examiner* — Jason Michael Pinga
(74) *Attorney, Agent, or Firm* — Hoffman Warnick LLC

(57) ABSTRACT

A self-managed DRAM module and method. The module includes a plurality of DRAM chips; and a controller chip configured to compress a data chunk received from a host according to a process that includes: compressing the data chunk to generate a plurality of compression results, wherein each compression result includes a different block size; identifying an optimal compression result, wherein the optimal compression result has a lowest block size among the plurality of compression results that achieves a threshold compression; and storing the optimal compression result in the plurality of DRAM chips.

4 Claims, 10 Drawing Sheets

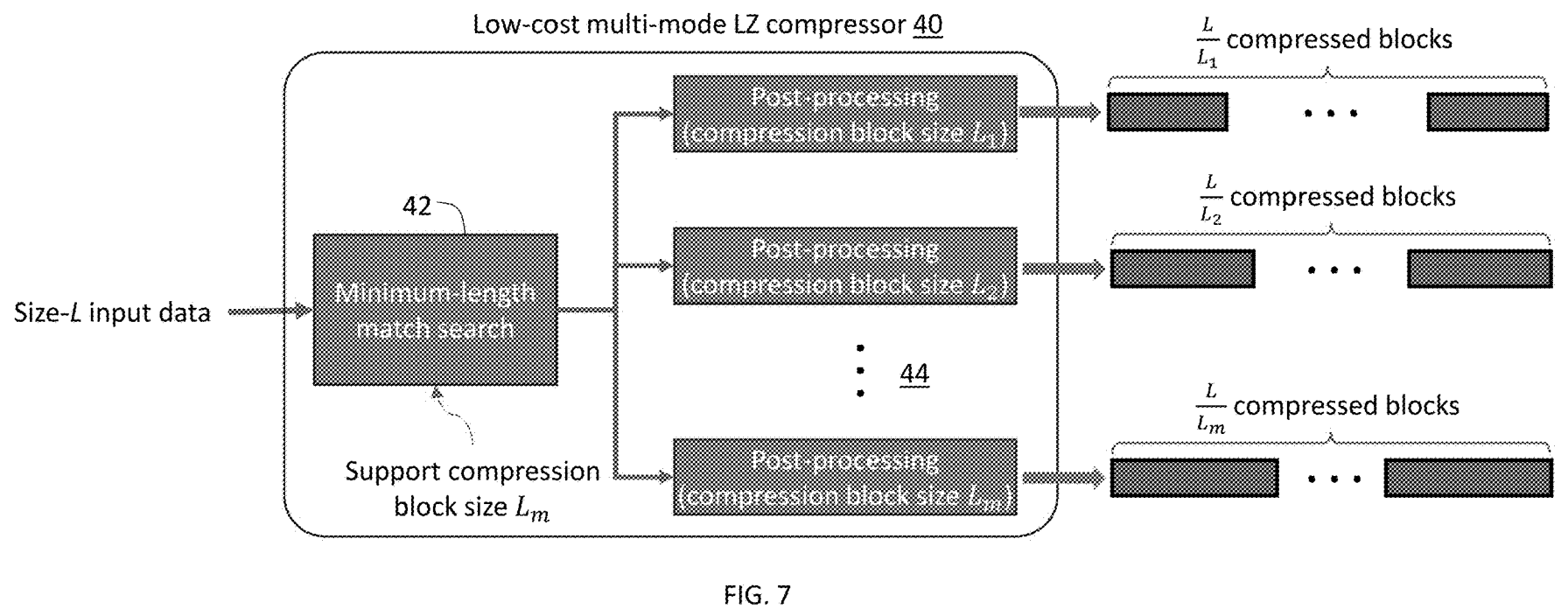

Low-cost multi-mode LZ compressor 40

Size-$L$ input data

42 Minimum-length match search

Support compression block size $L_m$

44

Post-processing (compression block size $L_1$)

Post-processing (compression block size $L_2$)

Post-processing (compression block size $L_m$)

$\frac{L}{L_1}$ compressed blocks $\frac{L}{L_2}$ compressed blocks $\frac{L}{L_m}$ compressed blocks

FIG. 7

SELF-MANAGED DRAM MODULES WITH BUILT-IN ADAPTIVE DATA COMPRESSION

TECHNICAL FIELD

The present invention relates to the field of solid-state memory, and particularly to improving the cost/energy efficiency of DRAM (dynamic random-access memory) modules.

BACKGROUND

Modern computers use DRAM (dynamic random-access memory) chips to implement memory systems. In conventional practice, each CPU chip connects to its exclusively owned/controlled DRAM modules, typically in the form of DIMM (dual in-line memory module), through dedicated DDR (double data rate) channels. Each CPU chip incorporates one or multiple DRAM controllers, and each DRAM controller is responsible for controlling all the DRAM chips on one DDR channel. As a result, the number of DRAM controllers inside a CPU chip determines the maximum DRAM capacity and bandwidth that are directly available to the CPU. Due to the high implementation complexity of DRAM controllers and hardware resources (e.g., the CPU chip pins) consumed by each DDR channel, modern CPUs can only integrate a relatively small number (e.g., 8 or 12) of DRAM controllers, leading to a limited DRAM capacity and bandwidth that are directly available to the CPU. Meanwhile, it is very difficult for a group of CPUs to share/pool their DRAM resources to improve the overall memory utilization efficiency.

To facilitate the DRAM capacity/bandwidth expansion and pooling/sharing, the computing industry has developed open standards, in particular CXL (compute express link), that allow CPU-memory connections over high-speed PCIe links. In this context, much of DRAM control/management functionalities are migrated from CPUs into the DRAM modules, leading to self-managed DRAM modules in contrast to the conventional CPU-managed DRAM modules. Because modern CPUs can communicate with other devices through many PCIe lanes/channels, CPUs could connect to many self-managed DRAM modules (e.g., CXL-based DRAM modules) to expand their memory capacity/bandwidth. Moreover, unlike conventional CPU-managed DRAM modules, one self-managed DRAM module can directly connect to multiple CPUs. Hence a self-managed DRAM module can be easily shared among multiple CPUs, which allows multiple CPUs pool memory resources together to improve the overall memory utilization efficiency.

SUMMARY

Accordingly, embodiments of the present disclosure are directed to methods for achieving better speed performance versus compression ratio trade-offs for self-managed DRAM modules in computing systems.

One aspect provides a self-managed DRAM module, having: a plurality of DRAM chips; and a controller chip configured to compress a data chunk received from a host according to a process that includes: compressing the data chunk to generate a plurality of compression results, wherein each compression result includes a different block size; identifying an optimal compression result, wherein the optimal compression result has a lowest block size among the plurality of compression results that achieves a threshold compression; and storing the optimal compression result in at least one of the plurality of DRAM chips.

A further aspect provides a method of compressing data for a self-managed DRAM module, comprising: compressing a data chunk to generate a plurality of compression results, wherein each compression result includes a different block size; identifying an optimal compression result, wherein the optimal compression result has a lowest block size among the plurality of compression results that achieves a threshold compression; and storing the optimal compression result in at least one of a plurality of DRAM chips in the self-managed DRAM module.

Another aspect provides a self-managed DRAM module, including: a plurality of DRAM chips; and a controller chip configured to compress a data chunk received from a host according to a process that includes: applying LZ compression on the data chunk to generate an LZ compressed block; applying entropy coding to the LZ compressed block to generate an LZ/entropy compressed block; evaluating a read latency of the LZ compressed block and the LZ/entropy compressed block; and selecting one of the LZ compressed block or the LZ/entropy compressed block for storage in at least one of the DRAM chips based on the read latencies of the LZ compressed block and the LZ/entropy compressed block.

A further aspect provides a method of compressing data for a self-managed DRAM module, comprising: applying LZ compression on the data chunk to generate an LZ compressed block; applying entropy coding to the LZ compressed block to generate an LZ/entropy compressed block; evaluating a read latency of the LZ compressed block and the LZ/entropy compressed block; and selecting one of the LZ compressed block or the LZ/entropy compressed block for storage in at least one of the DRAM chips of the self-managed DRAM module based on the read latencies of the LZ compressed block and the LZ/entropy compressed block.

BRIEF DESCRIPTION OF THE DRAWINGS

The numerous advantages of the present invention may be better understood by those skilled in the art by reference to the accompanying figures in which:

FIG. 7 illustrates a proposed low-cost multi-mode LZ compression engine according to embodiments.

Figure 1:
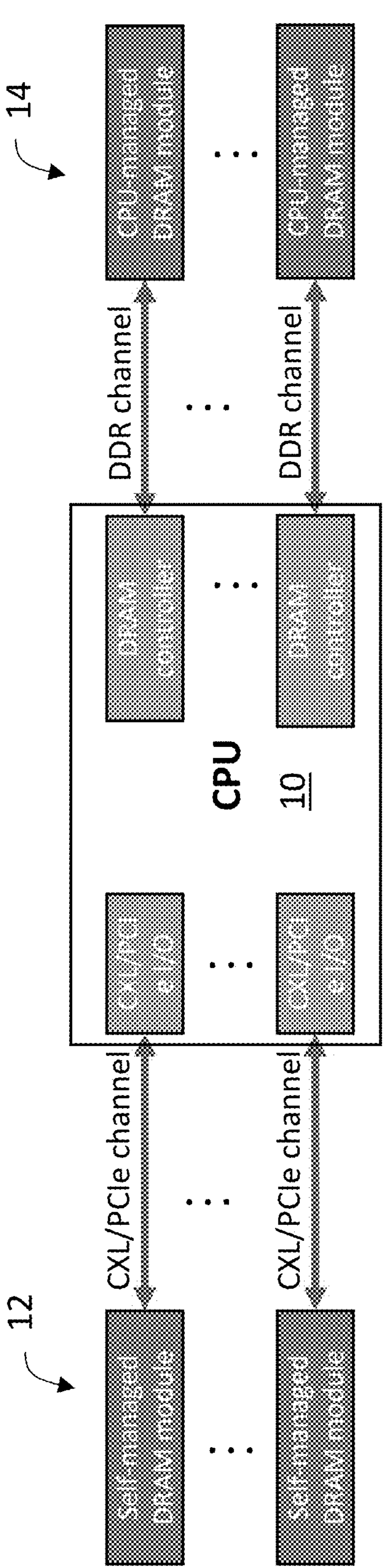
FIG. 1 illustrates a CPU connecting to both CPU-managed DRAM modules through DDR channel and self-managed DRAM modules through CXL/PCIe channel according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

FIG. 1 illustrates a CPU (also referred to herein as host, host processors, or CPU chip) 10 connected with both CPU-managed DRAM modules 14 through DDR channels and self-managed DRAM modules 12 through CXL/PCIe channels. All the DRAM modules 14 on one DDR channel are fully controlled/managed by one DRAM controller inside the CPU chip 10. Using an integrated CXL/PCIe I/O engine (that is much simpler than a DRAM controller), the CPU connects to one self-managed DRAM module 12 through a CLX/PCIe channel. Each self-managed DRAM module 12 internally controls/manages the DRAM chips on its own and serves requests (e.g., data read and write) from host processors through the CXL/PCIe channel.

Figure 2:
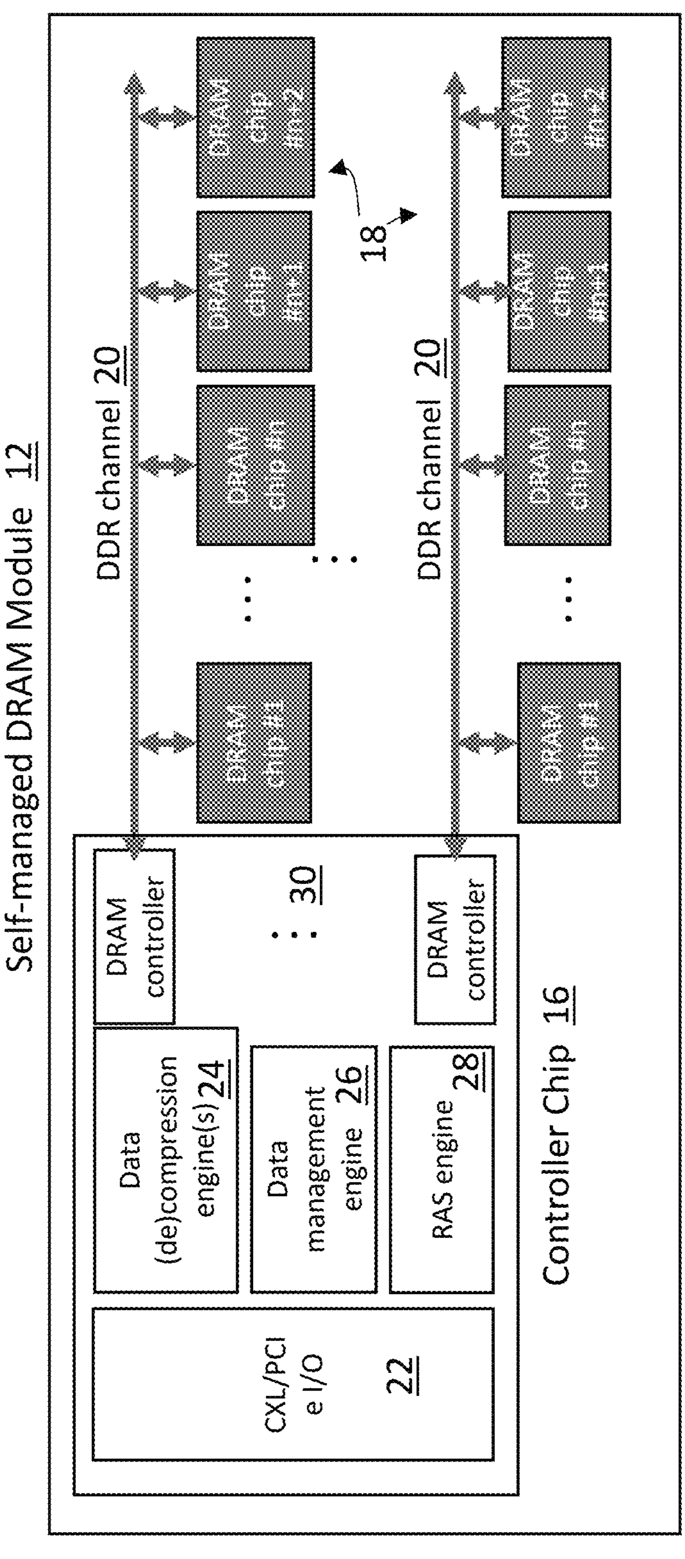
FIG. 2 illustrates the architecture of a self-managed DRAM module that supports data compression according to embodiments.

FIG. 2 depicts an example of a self-managed DRAM module 12. Self-managed DRAM modules 12 make it possible to deploy lossless data compression to expand the usable memory capacity at zero cost overhead. The controller chip 16 inside self-managed DRAM modules 12 is responsible for data compression/decompression, being transparent to host CPUs. To achieve high compression ratio, lossless data compression should be performed in the unit of large block size (e.g., 1 KB, 2 KB, or 4 KB). Nevertheless, host processors typically access self-managed DRAM modules 12 in a fine granularity (e.g., 64B). Such significant size mismatch inevitably causes DRAM read/write amplification and hence degrades speed performance, leading a trade-off between the speed performance and compression ratio. Embodiments provided herein achieve better speed performance vs. compression ratio trade-offs for self-managed DRAM modules 12.

By reducing the data in-memory footprint, lossless data compression can reduce the effective memory bit cost. Self-managed DRAM modules could internally implement data compression, transparent to host processors. Since in-memory data tend to have high compressibility (e.g., compression ratio of 2:1 and above), such compression-capable self-managed DRAM modules could achieve significant memory cost reduction.

FIG. 2 illustrates the architecture of a self-managed DRAM module that performs internal data compression. It contains a controller chip 16 and multiple DRAM chips 18. All the DRAM chips 18 are organized into multiple DDR channels 20, where each channel contains n+2 DRAM chips (n=8 when using latest DDR5 DRAM chips). As illustrated in FIG. 2, the controller chip contains (i) a CXL/PCIe I/O engine 22 to communicate with host processors, (ii) multiple DRAM controllers 30, each one controls all the n+2 DRAM chips on one DDR channel, (iii) data compression and decompression engine 24 that performs data (de) compression, (iv) data management engine 26 that manages the storage of compressed data blocks on DRAM chips, and (v) RAS (reliability, availability, and serviceability) engine 28 that is responsible for the reliability, availability, and serviceability of the entire self-managed DRAM module 12. To ensure the data storage reliability, the RAS engine 28 protects data with an ECC (error correction code), where ECC coding redundancy should cover two DRAM chips on each channel to tolerate a catastrophic failure of one DRAM chip. Therefore, among the total n+2 DRAM chips on each DDR channel, n chips store user data and 2 chips store ECC coding redundancy.

Host processors (i.e., host or CPUs) 10 access self-managed DRAM modules 12 in the unit of cachelines and let $S_{cache}$ denote the number of bytes in each cacheline. Most CPUs set the cacheline size as 64 B (i.e., $S_{cache}$=64). Since data compression ratio tends to improve as the compression block size increases, self-managed DRAM modules 12 should perform data compression in the unit of relatively large block size (e.g., 1 KB, 2 KB, or 4 KB) to achieve high compression ratio (e.g., 2:1 and above). As discussed above, host processors 10 access self-managed DRAM modules in the use of cachelines with the typical size of 64 B. The cacheline size versus compression block size mismatch (e.g., 64B vs. 4 KB) inevitably causes significant DRAM read/write amplification inside self-managed DRAM modules 12.

For example, let $S_{blk}$ denote the number of bytes of each compression block (e.g., 1 KB, 2 KB, or 4 KB). To serve a cacheline read (or write) request from host processors, self-managed DRAM modules must internally read/decompress (or read/decompress/modify/compress) an $S_{blk}$-byte data block from DRAM chips, leading to read/write amplification of $$\frac{S_{blk}}{S_{cache}}.$$

For example, given 04-byte cachelines and 4 KB compression blocks, the internal DRAM read/write amplification is $$\frac{S_{blk}}{S_{cache}} = \frac{4K}{64} = 64.$$

Such a high internal read/write amplification will significantly degrade the DRAM data access bandwidth utilization efficiency and hence degrade the speed performance of self-managed DRAM modules 12 on serving read/write requests from host processors. In essence, self-managed DRAM modules 12 with built-in compression are fundamentally subject to a trade-off between the speed performance and compression ratio.

The following two techniques are described to achieve better trade-offs between the speed performance and compression ratio. Both techniques share the common theme of content-adaptive compression configuration. The first technique achieves a better trade-off via adaptive compression block size configuration. This technique is motivated by the following observation: Although one could improve the compression ratio by increasing the compression block size, different data content may exhibit very different dependency of compression ratio on compression block size. For example, for some data, increasing the compression block size from 1 KB to 4 KB could significantly improve the compression ratio (e.g., by 50% and more); while for some other data, increasing the compression block size from 1 KB to 4 KB can only slightly improve the compression ratio (e.g., 10% and below).

Therefore, a concept of this first technique is to exam the compression ratio under multiple different compression block sizes, from which we choose the most appropriate compression block size, i.e., to provide the optimal compression result. In one approach, let $\{L_1, L_2, \ldots L_m\}$ denote m different permissible compression block sizes, where $L_i<L_{i+1}$ (e.g., $L_1$=1 KB, $L_2$=2 KB, $L_3$=4 KB with m=3). Define L=1 cm ($L_1, L_2, \ldots L_m$), where 1 cm( ) represents the least common multiple (LCM) of multiple integers. Given a size-L data chunk, we compress it with m different compression block sizes.

Figure 3:
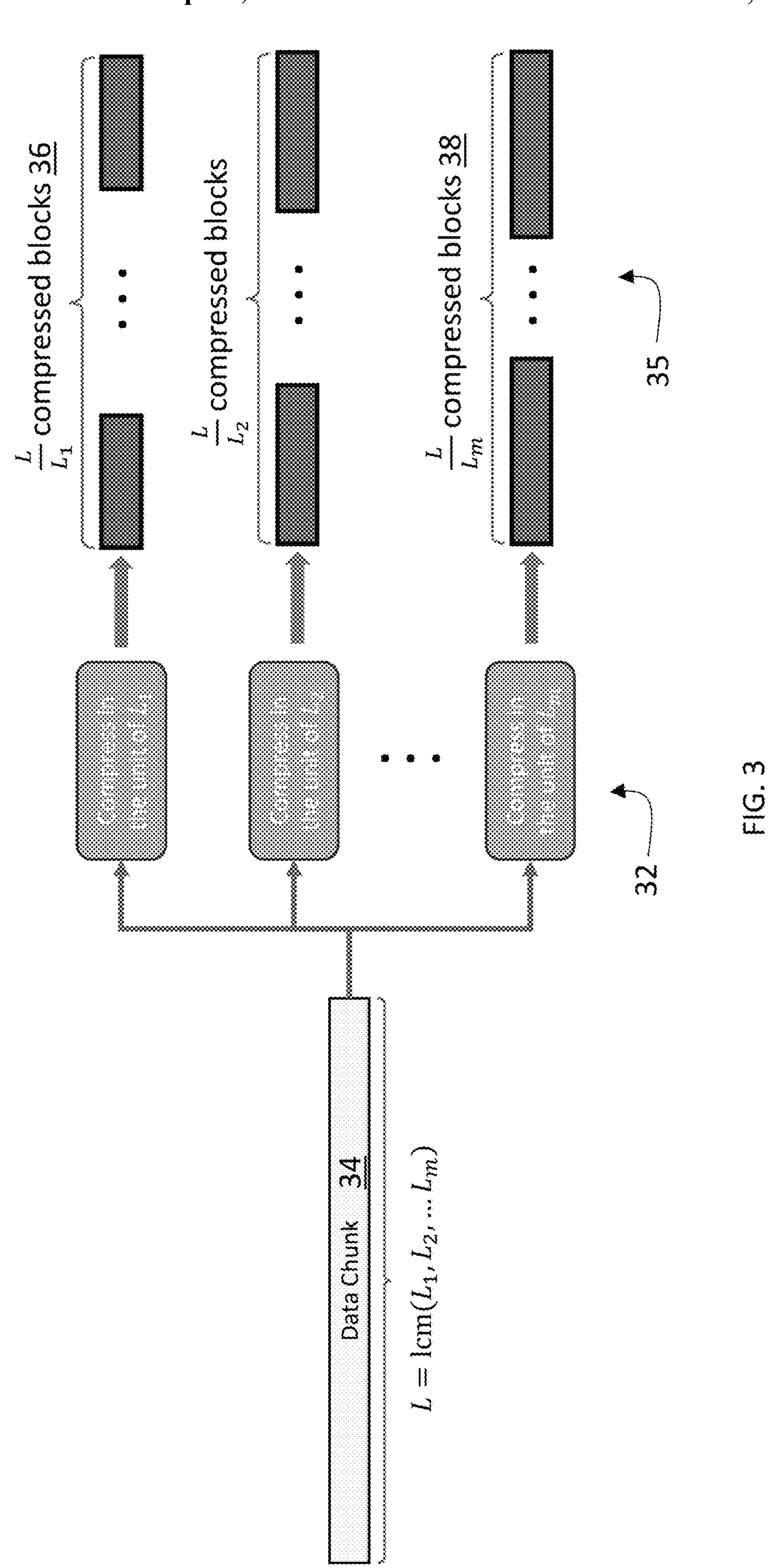
FIG. 3 illustrates compressing one data chunk with multiple different compression block sizes according to embodiments.

FIG. 3. depicts an architecture for implementing such an approach that includes m compression engines 32 that compress a data chunk 34 using different block sizes to generate a set of compression results 35. In the example shown in FIG. 3, the $L/L_1$ compressed blocks scenario 36 have the largest number of blocks, and therefore the lowest compression ratio. Conversely, the $L/L_m$ compressed blocks scenario 38 have the smallest number of blocks, and therefore the largest compression ratio.

Figure 4:
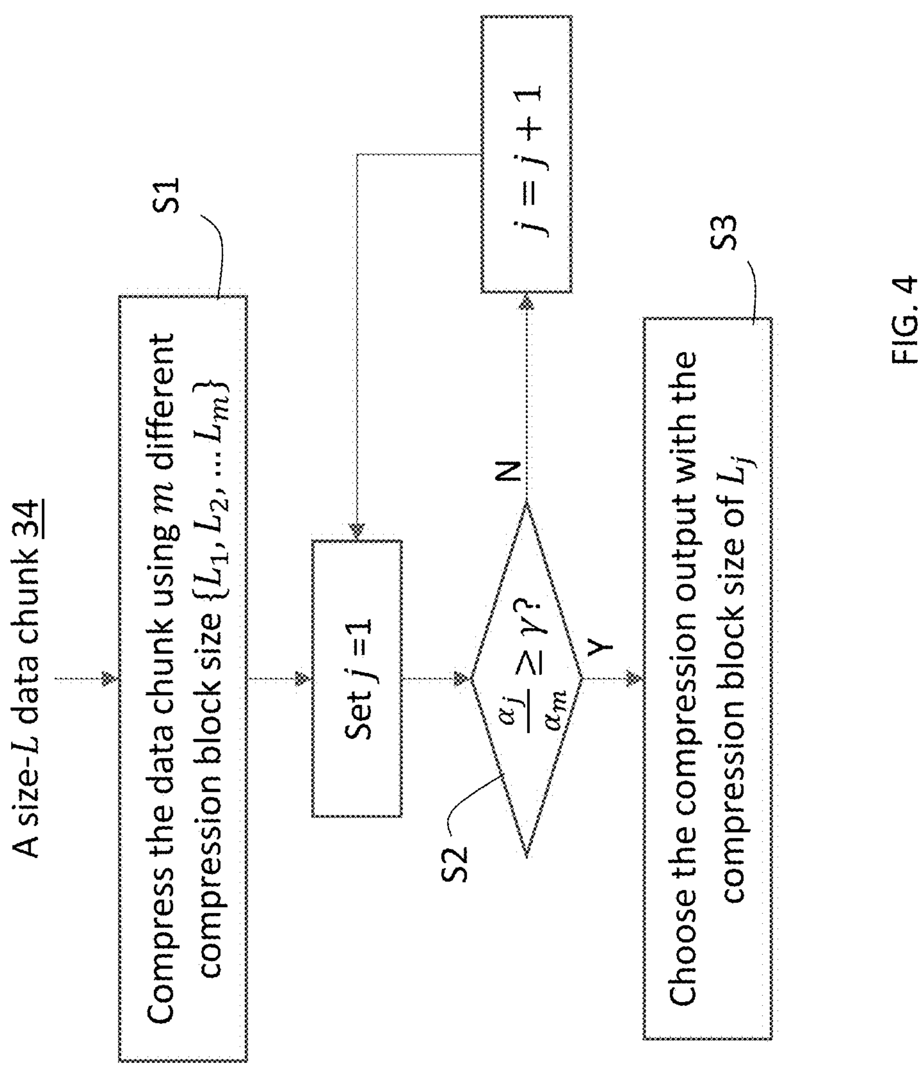
FIG. 4 illustrates the flow diagram of choosing the compression block size according to embodiments.

FIG. 4 depicts an illustrative approach for processing a size L data chunk 34 using m compression block sizes to identify an optimal compression result. Let $\alpha_i \geq 1$ denote the overall compression ratio of the size-L data chunk under each compression block size $L_i$, and therefore $\alpha_1 \leq \alpha_2 \leq \ldots \leq \alpha_m$. Initially, a desired percentage or compression threshold $\gamma<1$ is defined. As illustrated in FIG. 4, the process searches for the minimum value of j that can satisfy $$\frac{\alpha_j}{\alpha_m} \geq \gamma,$$

and accordingly choose the compression result with the compression block size of $L_j$. In this way, the process can dynamically adjust the compression block size in adaptation to the content-dependent dependency of compression ratio on compression block size. Namely, the process identifies the optimal compression result by sequentially evaluating compression ratios for compression results relative to the compression ratio of the compression result having a largest block size. As shown, the data chunk 34 is first compressed using the different block sizes at S1 to generate a set of compression results. At S3, starting with j=1 (i.e., the smallest block size), a determination is made whether the compression ratio $\alpha_j$ of the current compression relative to the highest compression ratio $\alpha_m$ is greater than or equal to the predefined threshold value at S2. If so, that compression block size is used as the optimal compression result at S3. If not, j is incremented (i.e., the next smallest block size), and the compression ratio of the next block is evaluated at S2. The process continues until a smallest block size that achieves the desired compression ratio is identified. The threshold $\gamma$ can be selected in any manner to achieve a desired balance between speed and compression. For example, 0.9 would indicate that the compression ratio of the optimal compression result must be at least 90% of the highest compression ratio am. Once the block configuration with the optimal compression ratio is established, the compressed data chunk is stored using that configuration in one or more DRAM chips of the self-managed DRAM module 12. The remaining configuration can be discarded. The configuration, i.e., the number and/or size of the blocks used for compression can be stored by the controller chip and later retrieved for decompression.

Figure 5:
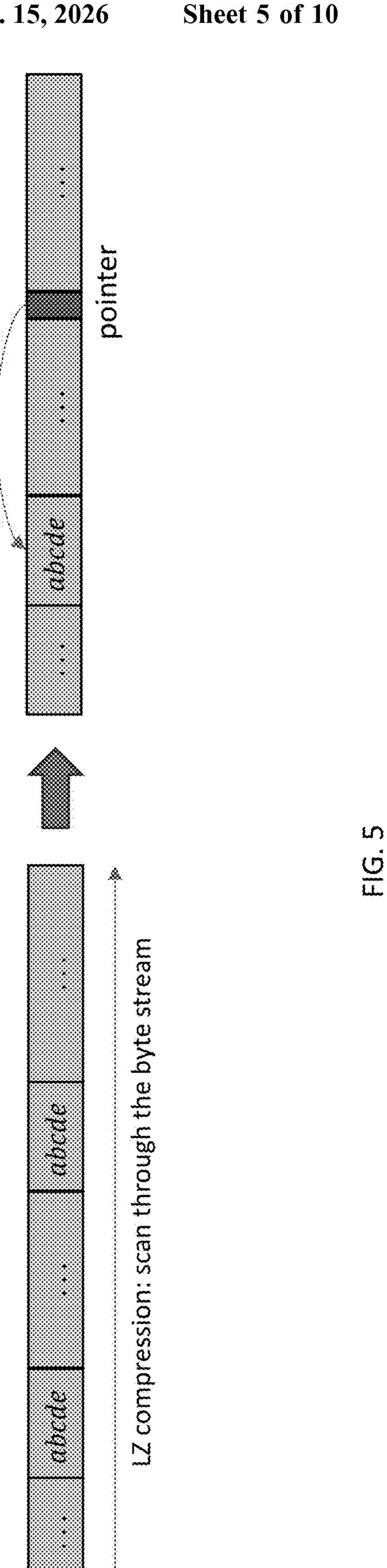
FIG. 5 illustrates LZ compression reducing data size by deduplicating repeated byte-strings according to embodiments.
Figure 6:
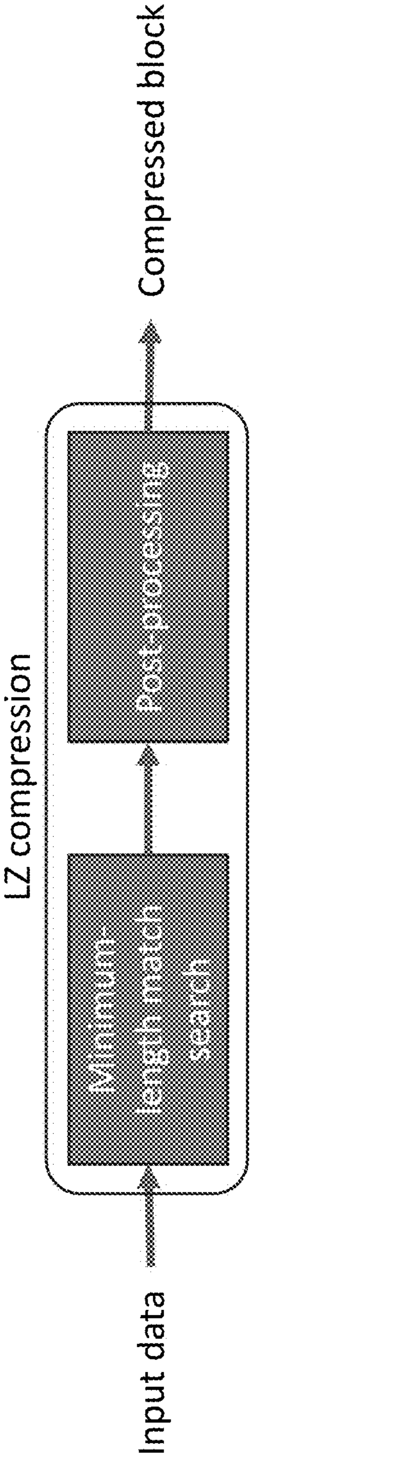
FIG. 6 illustrates that LZ compression consists of two steps according to embodiments.

One issue of this technique is that the same data must be compressed multiple rounds with different compression block sizes. In the most straightforward manner, the chip needs to implement m separate compression engines 32 independently and concurrently compress the same size-L data chunk with m different compression block sizes. Compared with using a single and fixed compression block size, this could increase the overall silicon implementation cost of compression by m×. An illustrative solution that can reduce the overall silicon implementation cost can be provided as follows. First, we note that general-purpose lossless compression typically uses the LZ compression strategy that scans through the data block to identify and accordingly deduplicate repeated byte-strings. As illustrated in FIG. 5, once the LZ compressor identifies the multiple occurrences of "abcdef", it can replace each "abcdef" (except the first occurrence) with a small-size pointer, leading to a reduction of data size. Hence, the key task of LZ compression is searching for repeated byte-strings with the largest possible length, for which LZ compression engine involves two processes (as illustrated in FIG. 6):

1. Minimum-length match search: The engine first utilizes a data structure (e.g., hash) to find repeated byte-string with a minimum length (e.g., 3 or 4) at a low silicon implementation cost.
2. Post-processing: Based on each minimum-length match, further check whether a longer-length match can be used.

The silicon implementation cost of the $1^{st}$ step (minimum-length match search) tends to be much higher than that of the $2^{nd}$ step.

FIG. 7 provides a low-cost multi-mode LZ compressor hardware 40 to address the aforementioned issue. The hardware 40 implements only a single minimum-length match search engine 42 that can support the maximum compression block size $L_m$, i.e., engine 42 generates a search result based on processing the data chunk 34 for the largest, i.e., maximum, block size. Its search result is fed to m independent post-processing engines 44 that post process the search result, each one corresponds to one specific compression block size.

Figure 8:
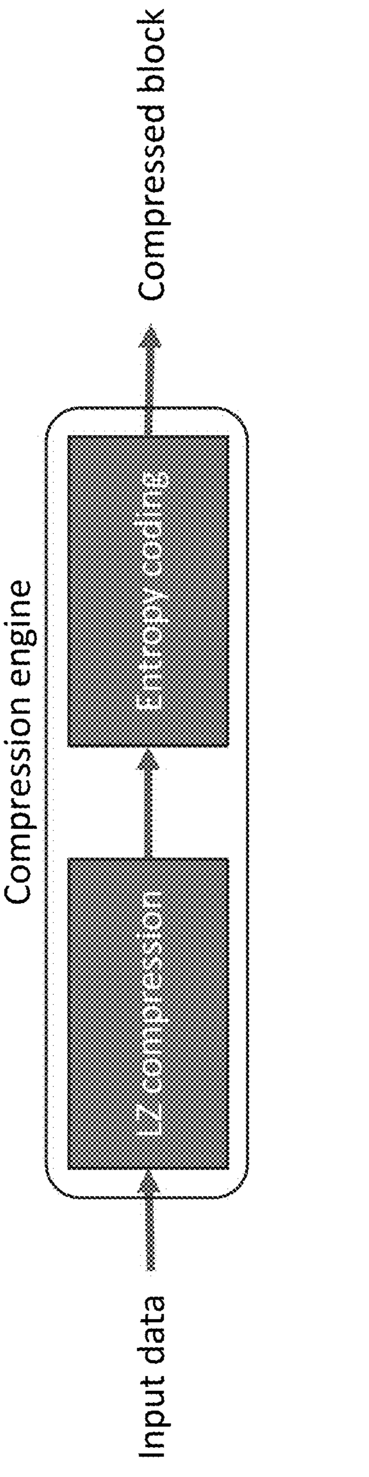
FIG. 8 illustrates complementing LZ compression with entropy coding to improve the compression ratio according to embodiments.
Figure 9:
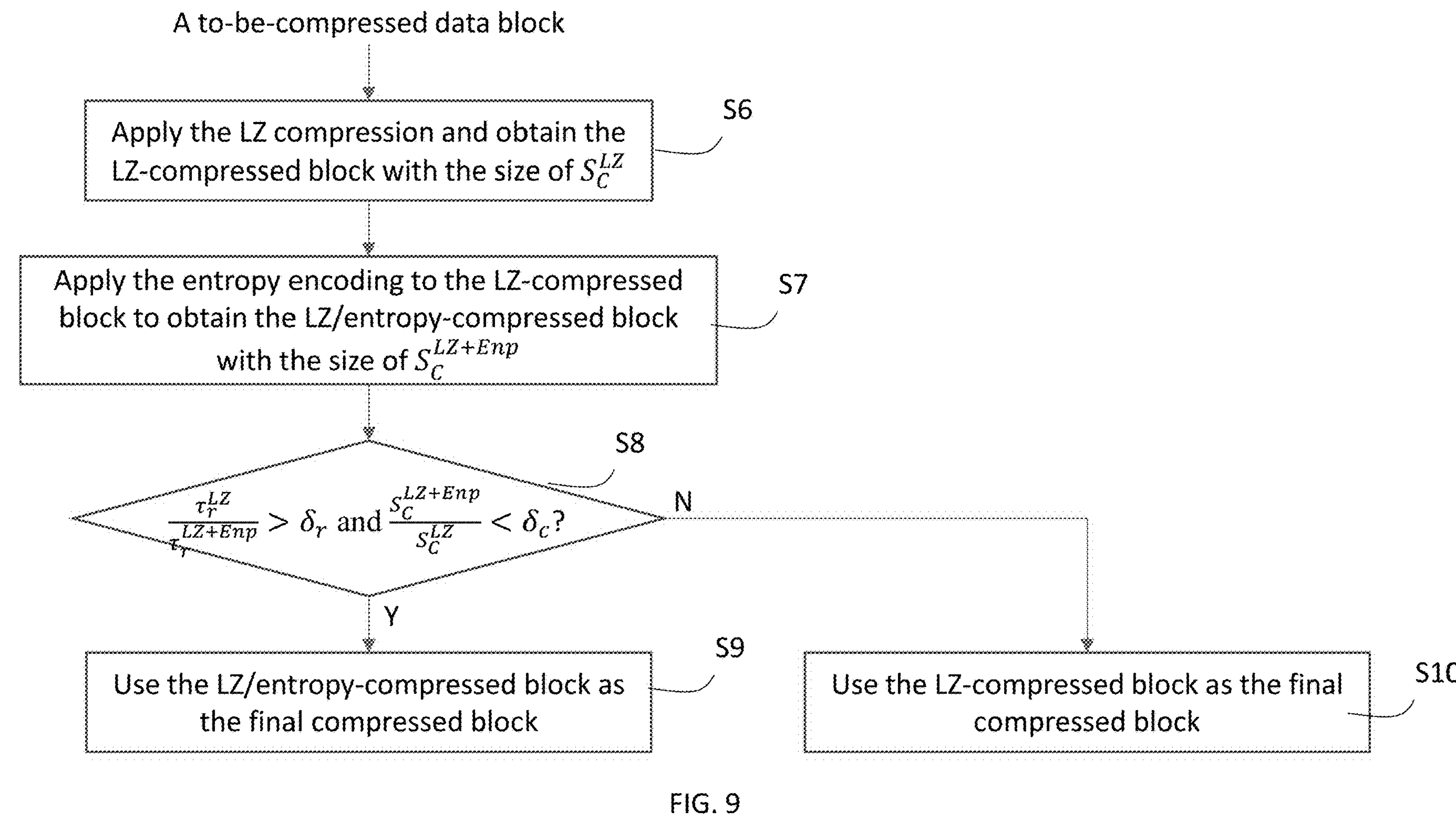
FIG. 9 illustrates the flow diagram of deciding the final compressed block when using adaptive addition of entropy coding according to embodiments.
Figure 10:
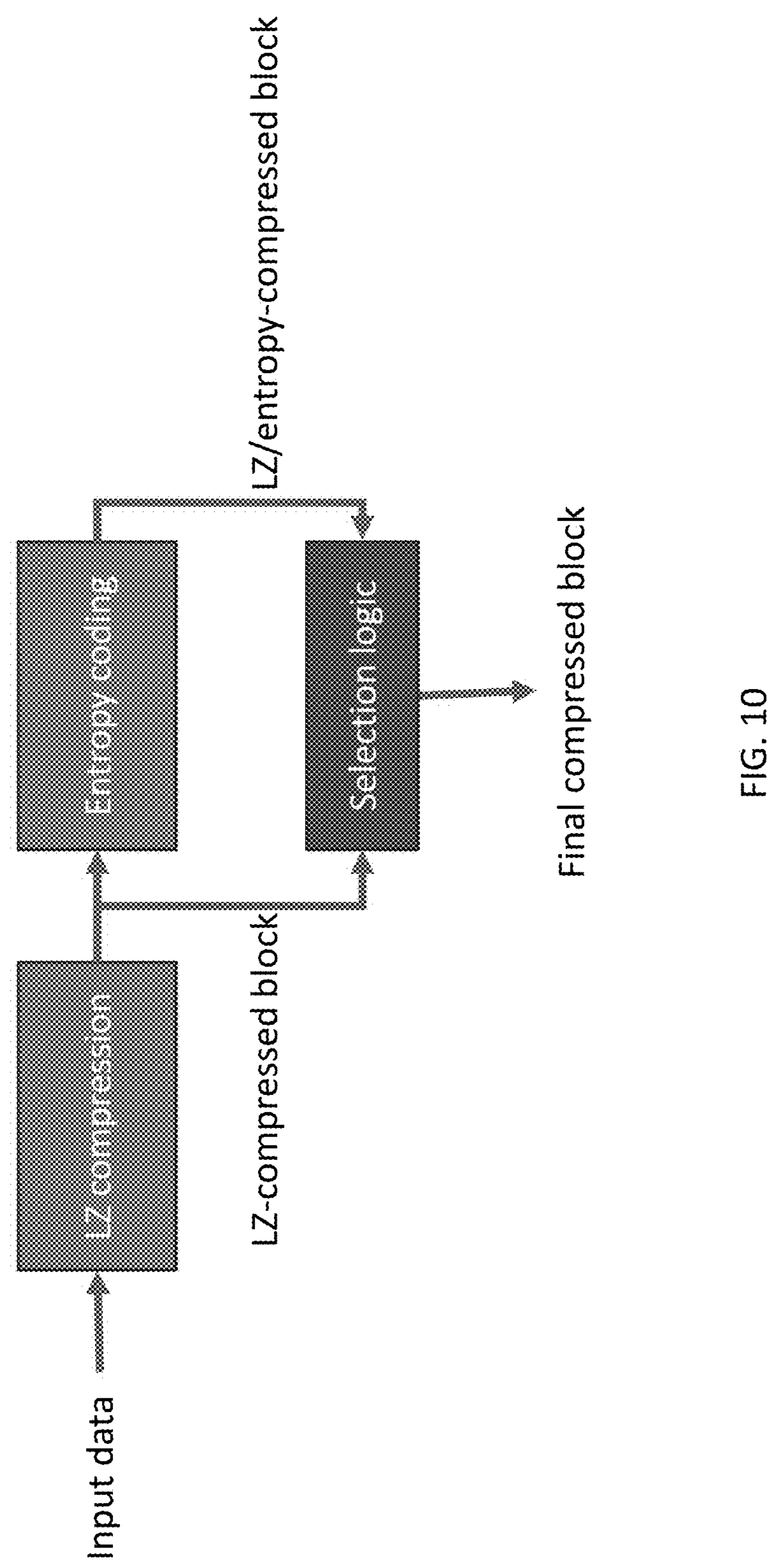
FIG. 10 illustrates the compressor architecture in support of adaptive ON/OFF of entropy coding according to embodiments.

FIGS. 8-10 depict a second design technique that achieves better trade-offs between the speed performance and compression ratio via adaptive addition of entropy coding. First, we note that, when the CXL memory controller fetches a compressed block from DRAM and decompresses the block, its overall latency can be estimated as $$\tau_r = \max\left(\frac{S_C}{B_{DRAM}}, \frac{S_C}{B_{DEC}}\right),$$

where $S_C$ denotes the size of the compressed block, $B_{DRAM}$ denotes the DRAM data transfer bandwidth, and $B_{DEC}$ denotes the decompression engine throughput. To improve the compression ratio (and hence reduce the compressed block size $S_C$), one common practice is to append LZ compression with entropy coding, as illustrated in FIG. 8. Popular entropy coding techniques include Huffman coding and arithmetic coding, which are used by modern compression libraries such as GZIP and ZSTD. Although complementing LZ compression with entropy coding could improve the compression ratio and hence reduce the compressed block size $S_C$, entropy decoding tends to suffer from relatively low decoding throughput, leading to a lower throughput $B_{DEC}$ of the decompression engine. As a result, when a system complements LZ compression with entropy coding to improve the compression ratio, its impact on the read latency $\tau_r$ may vary from one data block to another, dependent upon how much entropy coding could improve the compression ratio.

Accordingly, this approach proposes a design technique that dynamically determines the ON/OFF of entropy coding on the per-block basis. When the engine compresses each data block, it always perform LZ compression followed by entropy coding. Let $$S_C^{LZ}$$

denote the size of compressed block after LZ compression, and $$S_C^{LZ+Enp}$$

denote the size of compressed block after LZ compression and entropy coding. We have that $$S_C^{LZ} \geq S_C^{LZ+Enp}. \text{ Meanwhile, let } B_{DEC}^{LZ}$$

denote the throughput of the decompression engine that only performs LZ decompression, and $$B_{DEC}^{LZ+Enp}$$

denote the throughput of decompression engine that performs both LZ decompression and entropy decoding. We have that $$B_{DEC}^{LZ} \geq B_{DEC}^{LZ+Enp}.$$

Accordingly, we can estimate the read latency $$\tau_r^{LZ} \text{ and } \tau_r^{LZ+Enp}$$

when we turn OFF and ON entropy coding as $$\tau_r^{LZ} = \max\left(\frac{S_C^{LZ}}{B_{DRAM}}, \frac{S_C^{LZ}}{B_{DEC}^{LZ}}\right), \tau_r^{LZ+Enp} = \max\left(\frac{S_C^{LZ+Enp}}{B_{DRAM}}, \frac{S_C^{LZ+Enp}}{B_{DEC}^{LZ+Enp}}\right)$$

We have that $$\tau_r^{LZ} \leq \tau_r^{LZ+Enp}.$$

FIG. 9 illustrates the operational flow of data compression that uses the OFF and ON approach. Given one to-be-compressed data block, the engine first applies the LZ compression at S6 and obtains the LZ-compressed block with the size of $$S_C^{LZ},$$

then subsequently applies the entropy encoding at S7 to the LZ-compressed block to obtain the LZ/entropy-compressed block with the size of $$S_C^{LZ+Enp}.$$

Two fixed parameters $\delta_r<1$ and $\delta_c<1$ are defined. If $$\frac{\tau_r^{LZ}}{\tau_r^{LZ+Enp}} > \delta_R \text{ and } \frac{S_C^{LZ+Enp}}{S_C^{LZ}} < \delta_c$$

at S8, the engine will use the LZ/entropy-compressed block as the final compressed block at S9; otherwise the engine will use the LZ-compressed block as the final compressed block at S10.

FIG. 10 further illustrates the compressor architecture in support of adaptive ON/OFF of entropy coding. The input data is processed first with LZ compression to generate an LZ compressed block, which is fed into entropy coding to generate and LZ/entropy-compressed block. The LZ compressed block and LZ/entropy-compressed block are fed to selection logic to determine whether LZ compressed block or the LZ/entropy-compressed block will be stored.

It is understood that aspects of the present disclosure may be implemented in any manner, e.g., hardware, computer chips, as a software/firmware program, an integrated circuit board, a controller card, etc., that includes a processing core, I/O, memory and processing logic. Aspects may be implemented in a combination of hardware and software. Aspects of the processing logic may be implemented using field programmable gate arrays (FPGAs), application specific integrated circuit (ASIC) devices, and/or other hardware-oriented systems.

Aspects also may be implemented with a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, etc. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on a host computer, partly on a host computer, on a remote computing device (e.g., a memory card) or entirely on the remote computing device. In the latter scenario, the remote computing device may be connected to the host computer through any type of interface or network. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to control electronic circuitry in order to perform aspects of the present disclosure.

Computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by hardware and/or computer readable program instructions.

The flowcharts and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of various aspects of the present disclosure has been presented for purposes of illustration and description. It is not intended to be exhaustive or to limit the concepts disclosed herein to the precise form disclosed, and obviously, many modifications and variations are possible. Such modifications and variations that may be apparent to an individual in the art are included within the scope of the present disclosure as defined by the accompanying claims.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A self-managed dynamic random-access memory (DRAM) module, comprising:

a plurality of DRAM chips; and a controller chip configured to compress a data chunk received from a host according to a process that includes:

applying LZ compression on the data chunk to generate an LZ compressed block;

applying entropy coding to the LZ compressed block to generate an LZ/entropy compressed block; and estimating a read latency of the LZ compressed block and the LZ/entropy compressed block; and selecting one of the LZ compressed block or the LZ/entropy compressed block for storage in at least one of the DRAM chips based on the read latencies of the LZ compressed block and the LZ/entropy compressed block;

wherein an estimated read latency of the LZ compressed block and LZ/entropy compressed block are given as latency $$\tau_r^{LZ} \text{ and } \tau_r^{LZ+Enp},$$

and are determined as $$\tau_r^{LZ} = \max\left(\frac{S_C^{LZ}}{B_{DRAM}}, \frac{S_C^{LZ}}{B_{DEC}^{LZ}}\right), \tau_r^{LZ+Enp} = \max\left(\frac{S_C^{LZ+Enp}}{B_{DRAM}}, \frac{S_C^{LZ+Enp}}{B_{DEC}^{LZ+Enp}}\right)$$

in which $$S_C^{LZ}$$

denotes a size of compressed block after LZ compression, $$S_C^{LZ+Enp}$$

denotes a size of compressed block after LZ compression and entropy coding, $B_{DRAM}$ denotes a DRAM data transfer bandwidth, $$B_{DEC}^{LZ}$$

denotes a throughput or a decompression engine that only performs LZ decompression, and $$B_{DEC}^{LZ+Enp}$$

denotes a throughput of a decompression engine that performs both LZ decompression and entropy decoding.

2. The self-managed DRAM module of claim 1, wherein evaluating the read latency includes:

determining a first throughput of a decompression engine that performs LZ decompression on the LZ compressed block; and determining a second throughput of the decompression engine that performs both LZ decompression and entropy decoding on the LZ/entropy compressed block.

3. The self-managed DRAM module of claim 2, wherein evaluating the read latency further includes determining a size of the LZ compressed block and a size of the LZ/entropy compressed block.

4. The self-managed DRAM module of claim 1, wherein selecting one of the LZ compressed block or the LZ/entropy compressed block for storage is further based on a size of the LZ compressed block and a size of the LZ/entropy compressed block.

* * * * *